US012021905B2

(12) United States Patent
Sabeur et al.

(10) Patent No.: US 12,021,905 B2
(45) Date of Patent: Jun. 25, 2024

(54) REDUCING IMS NETWORK CONGESTION WHEN A NODE IN THE IMS NETWORK BECOMES UNAVAILABLE (71) Applicant: T-Mobile USA, Inc., Bellevue, WA (US)

(72) Inventors: Nassereddine Sabeur, Bellevue, WA (US); Saqib Badar, Bellevue, WA (US); Joel Arends, Renton, WA (US); Khurram Ahmad Mirza, Bellevue, WA (US); Marc Proctor, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/969,592

(22) Filed: Oct. 19, 2022

(65) Prior Publication Data
US 2024/0137395 A1 Apr. 25, 2024

(51) Int. Cl.
H04L 65/1073 (2022.01)
H04L 65/1016 (2022.01)

(52) U.S. Cl.
CPC ...... H04L 65/1073 (2013.01); H04L 65/1016 (2013.01)

(58) Field of Classification Search
CPC . H04L 65/1016; H04L 65/1073; H04L 41/06; H04L 69/40
See application file for complete search history.

(56) References Cited

U.S. PATENT DOCUMENTS

| | | | |
|---|---|---|---|
| 7,715,856 B2 | 5/2010 | Shaheen | |
| 7,974,604 B2 | 7/2011 | Yan et al. | |
| 8,270,418 B2 | 9/2012 | Vikberg et al. | |
| 8,284,712 B2 | 10/2012 | Ding et al. | |
| 8,335,487 B2 | 12/2012 | Wen et al. | |
| 8,340,084 B2 | 12/2012 | Nakada et al. | |
| 8,494,521 B2 | 7/2013 | Shi | |
| 8,503,312 B2 | 8/2013 | Przybysz et al. | |
| 8,514,870 B2 | 8/2013 | Ma et al. | |
| 8,989,178 B2 | 3/2015 | Nakada et al. | |

(Continued)

FOREIGN PATENT DOCUMENTS

| | | |
|---|---|---|
| CN | 101170577 A | 4/2008 |
| CN | 101997828 B | 10/2014 |

(Continued)

*Primary Examiner* — Lesa M Kennedy
(74) *Attorney, Agent, or Firm* — Perkins Coie LLP (57) ABSTRACT When operational, a first node of an IMS network handles a registration of a UE on the IMS network, and receives a first request to reregister the UE with the IMS network. The first node creates a registration confirmation, and sends the registration confirmation to the UE. The second node of the IMS network receives a second request to reregister the UE with the IMS network and an indication that the first node has failed. The second node reduces IMS network congestion by avoiding reporting to the UE that the first node has failed, and by sending a message confirming reregistration. Upon receiving the message, the UE considers the registration valid for a predetermined period. Upon expiration of the predetermined period the UE sends a request to reregister. The message prevents the UE from congesting the IMS network.

19 Claims, 6 Drawing Sheets

(56) References Cited

U.S. PATENT DOCUMENTS

| | | |
|---|---|---|
| 9,036,554 B2 | 5/2015 | Merino Vazquez et al. |
| 9,337,917 B2 | 5/2016 | Abdi |
| 9,408,064 B2 | 8/2016 | Zou et al. |
| 9,560,084 B2 | 1/2017 | Lindholm et al. |
| 9,578,068 B2 | 2/2017 | Merino Vazquez et al. |
| 9,584,551 B2 | 2/2017 | Chiduruppa et al. |
| 9,596,712 B2 | 3/2017 | Hallenstål et al. |
| 9,749,981 B2 | 8/2017 | Yared |
| 10,148,487 B2 | 12/2018 | Kunz et al. |
| 10,531,273 B2 | 1/2020 | Lauster |
| 10,567,581 B2 | 2/2020 | Stojanovski et al. |
| 10,652,737 B2 | 5/2020 | Baek et al. |
| 10,736,070 B2 | 8/2020 | Russell et al. |
| 10,812,534 B2 | 10/2020 | Chong et al. |
| 10,911,500 B1 | 2/2021 | Rahman |
| 11,050,799 B2 | 6/2021 | Zhu et al. |
| 11,283,773 B2 | 3/2022 | Noldus |
| 11,297,113 B2 | 4/2022 | Hallenstål |
| 11,394,752 B2 | 7/2022 | Al-Mehdar et al. |
| 11,438,831 B2 | 9/2022 | Stille et al. |
| 2003/0186681 A1* | 10/2003 | Gabor .............. H04L 63/108 380/247 |
| 2007/0213078 A1 | 9/2007 | Shaheen |
| 2008/0008157 A1 | 1/2008 | Edge et al. |
| 2008/0209532 A1 | 8/2008 | Wen et al. |
| 2009/0097398 A1 | 4/2009 | Belinchon et al. |
| 2010/0208671 A1 | 8/2010 | Tamura et al. |
| 2010/0223326 A1 | 9/2010 | Noldus et al. |
| 2010/0257272 A1* | 10/2010 | Belinchon .......... H04L 65/1073 709/227 |
| 2012/0173736 A1 | 7/2012 | Klein |
| 2014/0341085 A1 | 11/2014 | Suryavanshi et al. |
| 2015/0195864 A1 | 7/2015 | Bartolom et al. |
| 2015/0282242 A1 | 10/2015 | Merino et al. |
| 2021/0014769 A1 | 1/2021 | Jahangir et al. |
| 2021/0037586 A1 | 2/2021 | Foti |
| 2021/0258759 A1 | 8/2021 | Lindholm et al. |
| 2021/0297924 A1 | 9/2021 | Foti |
| 2023/0141522 A1* | 5/2023 | Sinha ................ H04L 65/1046 455/414.1 |

FOREIGN PATENT DOCUMENTS

| | | |
|---|---|---|
| CN | 108243403 B | 1/2021 |
| CN | 112291822 A | 1/2021 |
| CN | 112087780 B | 8/2022 |
| EP | 2083577 B1 | 7/2013 |
| EP | 3796715 B1 | 11/2021 |
| WO | 2007089383 A2 | 8/2007 |
| WO | 2009100638 A1 | 8/2009 |
| WO | 2012137173 A2 | 10/2012 |
| WO | 2013037251 A1 | 3/2013 |
| WO | 2013127469 A1 | 9/2013 |
| WO | 2014072407 A1 | 5/2014 |
| WO | 2016107161 A1 | 7/2016 |
| WO | 2017185943 A1 | 11/2017 |
| WO | 2019027538 A1 | 2/2019 |
| WO | 2020121024 A1 | 6/2020 |
| WO | 2021044271 A1 | 3/2021 |
| WO | 2021111302 A1 | 6/2021 |
| WO | 2021162500 A1 | 8/2021 |
| WO | 2021205339 A1 | 10/2021 |

\* cited by examiner

REDUCING IMS NETWORK CONGESTION WHEN A NODE IN THE IMS NETWORK BECOMES UNAVAILABLE

BACKGROUND

Internet Protocol Multimedia Subsystem, or IMS, is a standards-based architectural framework for delivering multimedia communications services such as voice, video, and text messaging over IP networks. The IMS specifications were originally created by the 3rd Generation Partnership Project (3GPP) to standardize the implementation of next-generation mobile networks. According to the 3GPP, IMS is not intended to standardize applications, but rather to aid the access of multimedia and voice applications from wireless and wireline terminals. Occasionally, nodes of the IMS network can fail, and the resulting requests for IMS service can further congest an already struggling network.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system and method can reduce Internet Protocol Multimedia Subsystem (IMS) network congestion when a Serving-Call Session Control Function (S-CSCF) fails. When the S-CSCF is operational, the UE initiates the IMS registration, while the S-CSCF handles the registration and determines if the UE is authorized to register on the IMS network. During this registration not only does the IMS network authorize the UE but also the UE authorizes the IMS network as well. After the initial registration, the S-CSCF can receive at a predetermined period, such as every 30 minutes or every 55 minutes, a first request to reregister the UE with the IMS network. The IMS network informs the UE about the duration of the registration, such as one or two hours. Prior to the expiration of the duration of the registration, the UE sends the request to reregister. Upon receiving the first request to reregister the UE, the S-CSCF can create a registration confirmation and can send the registration confirmation to the UE. The S-CSCF expends more computational resources to create the initial registration than to process the first request to reregister.

Occasionally, an S-CSCF can fail, and if so, the system receives an indication that the S-CSCF associated with an IMS network has failed. The IMS network is associated with a wireless communication network. The failure can include an issue with the S-CSCF processing capability or S-CSCF reachability in case of an IMS network transport event.

A Proxy-Call Session Control Function (P-CSCF) can receive a second request to reregister the UE with the IMS network, where the P-CSCF is an intermediary between a UE and the S-CSCF. A P-CSCF is a Session Initiation Protocol (SIP) proxy that is the first point of contact for a UE in a wireless telecommunication network. All SIP traffic to and from the UE must go through the P-CSCF. Upon receiving the second request to reregister the UE and the indication that the S-CSCF has failed, the P-CSCF can reduce IMS network congestion by avoiding reporting to the UE that the S-CSCF has failed, and by sending to the UE a copy of the registration confirmation associated with the UE. The P-CSCF thus avoids communicating with the failed S-CSCF. After receiving the copy of the registration, the UE waits a predetermined amount of time before sending a third request to reregister the UE. Receiving the copy of the registration prevents the UE from congesting the IMS network with multiple requests to initiate IMS registration issued within a second of each other, and prevents the IMS network from expending computational resources to process the request to initiate IMS registration because the computational resources required to process the request to initiate IMS registration exceed computational resources required to process a request to reregister.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
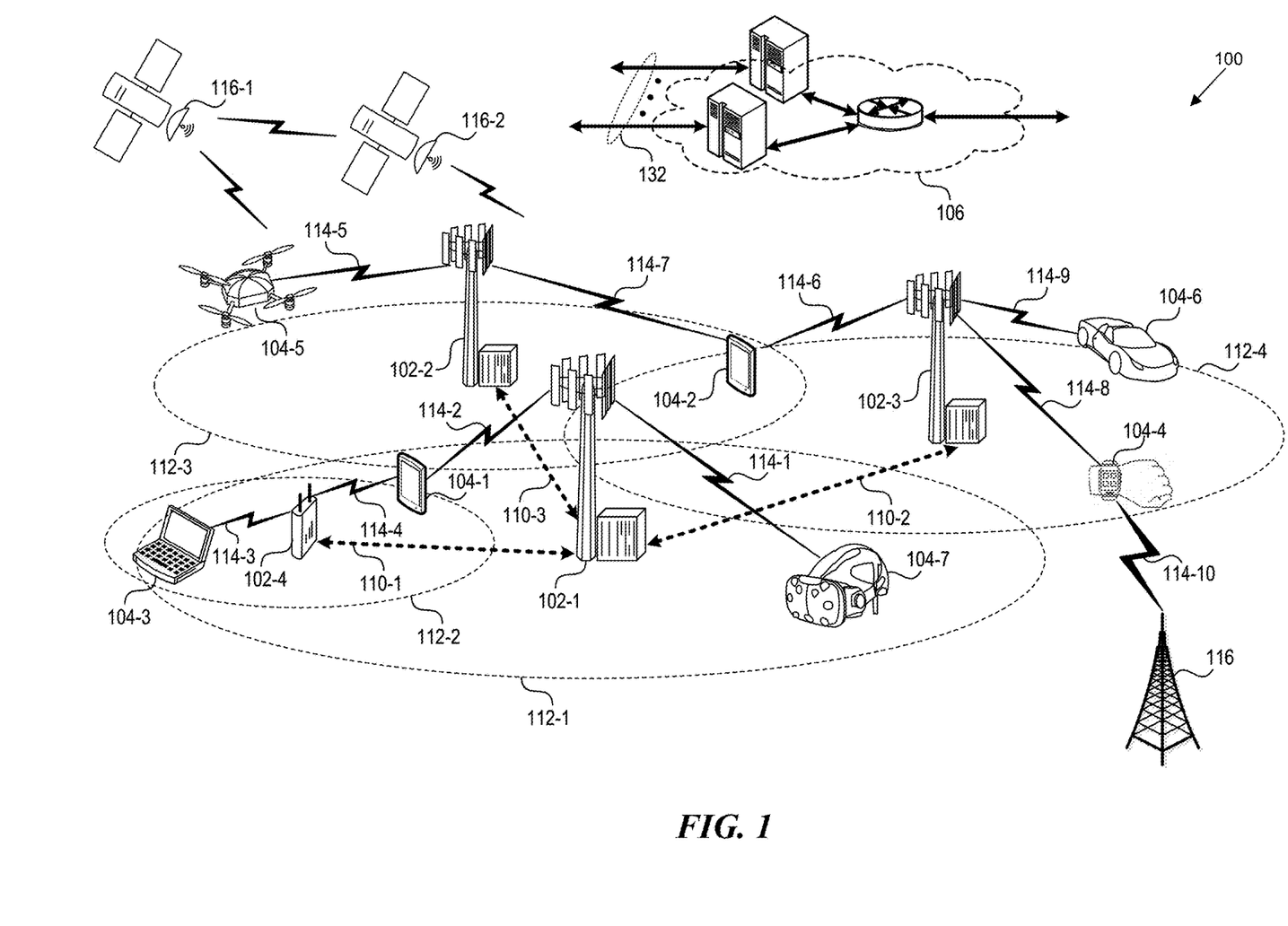
FIG. 1 is a block diagram that illustrates a wireless telecommunication network in which aspects of the disclosed technology are incorporated.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (VVWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultrareliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or node carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., node carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits per second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
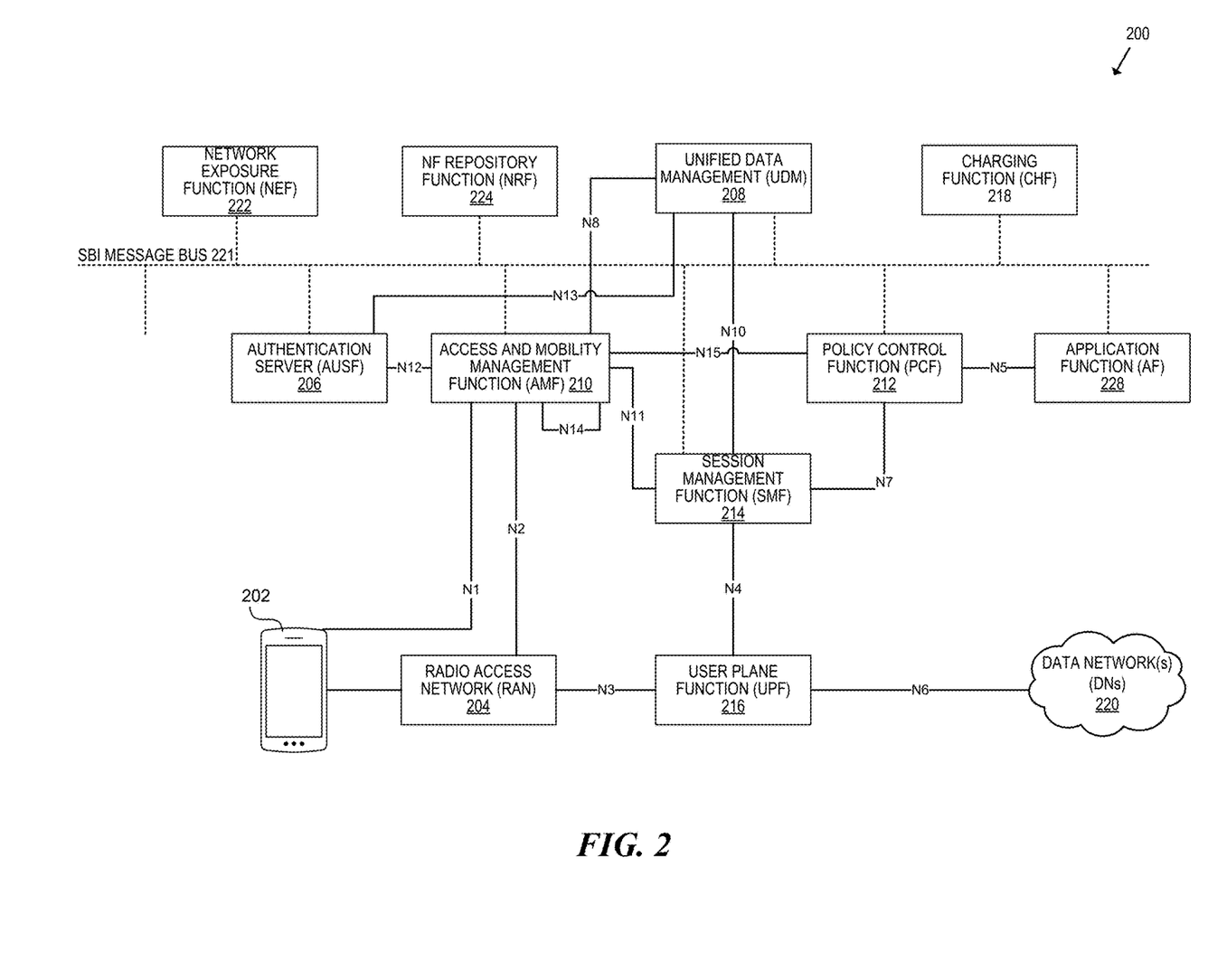
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), providing authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes network slice selection, which is regulated by the NSSF 226.

Figure 3:
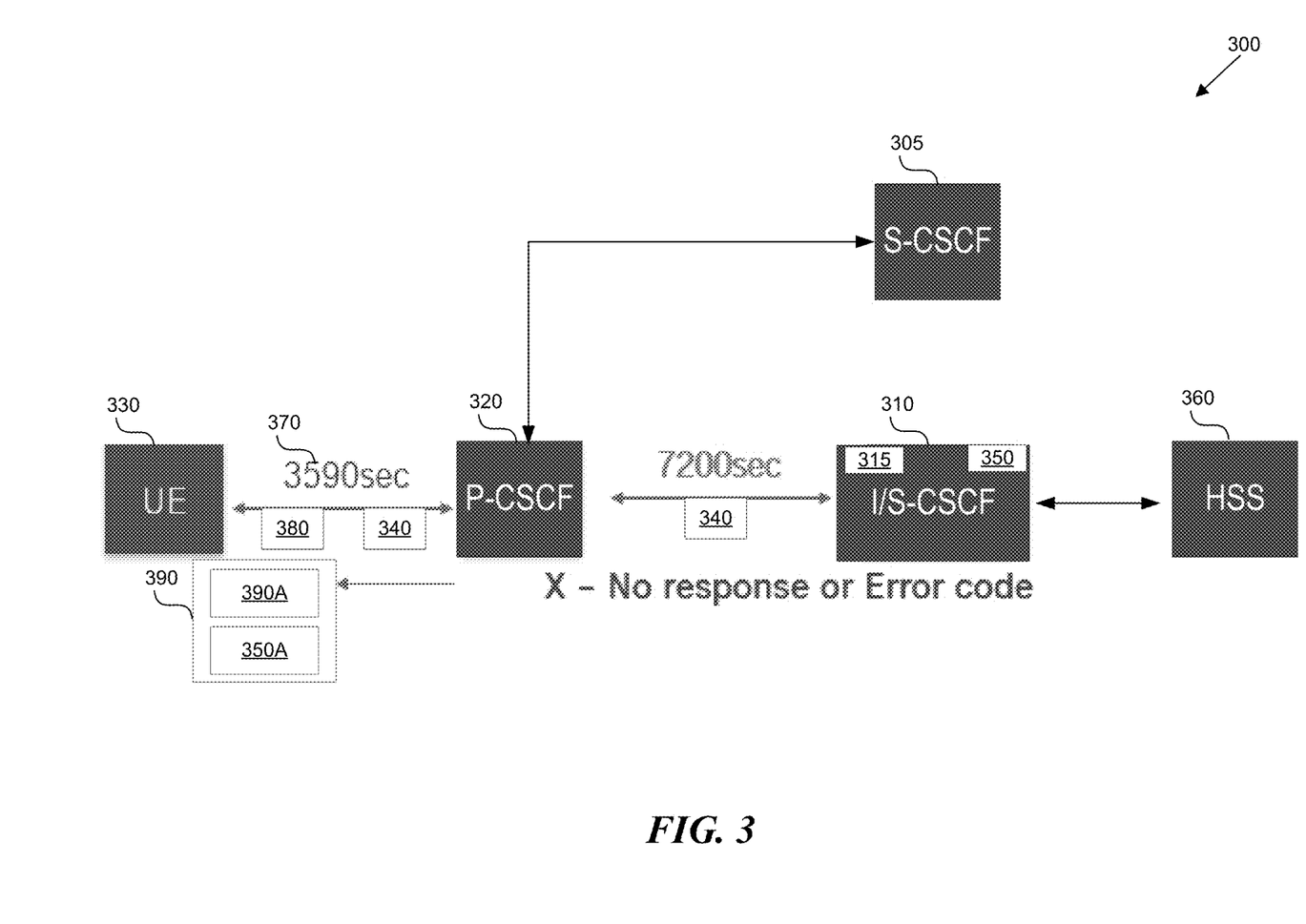
FIG. 3 shows a subset of nodes of the IMS network.

Reducing IMS Network Congestion When a Node in the IMS Network Becomes Unavailable FIG. 3 shows a subset of nodes 310, 320 of the IMS network 300. The first node 310 can be a combination of an Interrogation-Call Session Control Function (I-CSCF) and a Serving-Call Session Control Function (S-CSCF), namely I/S-CSCF, in the IMS network, while the second node 320 can be a Proxy-Call Session Control Function (P-CSCF). The I-CSCF obtains the request for the address of the S-CSCF from an HSS 360 after receiving an initiate registration request 340, and provides the initiate registration request 340 to the P-CSCF 320 for subsequent multimedia requests. The S-CSCF is responsible for conducting both registration and session control for the registered UE's sessions. The P-CSCF 320 is a SIP proxy that is the first point of contact for a UE in the network 100 in FIG. 1. All SIP traffic to and from the UE must go through the P-CSCF.

When the UE 330 wants to utilize IMS services, the UE can send the initiate registration request 340 to a second node 320, e.g., P-CSCF, of the IMS network 300. The second node 320 can forward the initiate registration request 340 to the first node 310, which then can create an initial registration 350 associated with the UE 330.

To create the initial registration 350, the first node 310 needs to perform a processor intensive operation. After the initial registration 350, the first node 310, and the second node 320 can maintain the UE binding information, where the first node acts as a SIP registrar. The first node 310 can also inform the application servers of the registration. The application servers are designed to handle various IMS services based on the UE capabilities determined during the registration procedure. The HSS 360 is updated with the address of the first node 310 so that any session related the UE is directed to the S-CSCF where the UE is registered.

The second node 320 can send a confirmation of registration to the UE 330, as well as a timer 370, indicating a maximum amount of time to wait prior to refreshing the initial registration. The maximum amount of time can vary and can be determined by the first node 310. For example, the maximum amount of time can be 3590 seconds, or 10 seconds less than a full hour.

The UE waits a portion of the amount of time, such as 30 minutes or 55 minutes, before sending a reregistration request 380 to the second node 320. The reregistration request 380 lets the IMS network 300 note that the UE 330 is still connected to the IMS network, and that the UE 330 is still expecting IMS service.

When the first node 310 is operational, the second node 320 sends the reregistration request 380 to the first node 310, and the first node 310 sends an acknowledgment to the UE 330. The processing of the reregistration request 380 requires fewer computational resources from the first node 310 than the processing of the initiate registration request 340. However, when the first node 310 is unavailable, such as when it has failed, the second node 320 can receive an error message from the first node 310. The error message can be indicative of the outage of the first node 310 or indicative of a timeout error. The second node 320 can receive various SIP error codes indicating the nature of the failure of the first node 310. In case of registration time-out, the second node 320 may not receive any response from the first node 310. Alternatively, the second node 320 can receive a SIP error such as 503 from the first node 310 indicating that the first node is not able to process the request due to system overload.

In case of failure, in normal operation, the second node 320 can send an error message back to the UE 330. When the UE 330 receives the error message, the UE 330 immediately sends back the initiate registration request 340, and can keep sending initiate registration requests every second, until the first node 310 recovers. When multiple UEs send initiate registration requests for the IMS network 300, the IMS network can be overwhelmed and congested by the numerous initiate registration requests, and the first node 310 that is trying to recover can have an even harder time recovering after having to process the numerous initiate registration requests. The second node 320 can indicate to the UE to retry after a predetermined amount of time, however with million of UEs registered on the IMS network 300, the retrying can result in a registration storm even though the UEs are retrying at different intervals of time recommended by the IMS network.

To reduce and prevent IMS network 300 congestion when the first node 310 is unavailable, the second node 320, upon receiving an error message from the first node 310 and receiving the reregistration request 380, does not contact the malfunctioning first node 310. Instead, the second node 320 copies the previously stored registration 350A. The previously stored registration 350A can be the initial registration 350, but can also be a previous reregistration. The second node 320 sends back a message 390 indicating that the UE has been reregistered. The message 390 can include a copy of the previously stored registration 350A associated with the UE, and a 200 OK message 390A indicating that everything is fine with the IMS network 300.

The UE 330, upon receiving the message 390, can wait for at most the amount of time specified by the timer 370 before sending a second request to be reregistered. Consequently, the UE 330 waits for another period of time, for example, 30 minutes or 55 minutes, before sending the second reregistration request. As a result, the IMS network 300 is not overwhelmed by a storm of rapid-succession initial-registration requests, and the first node 310 does not have to expend the processing power to process numerous initial-registration requests, once the first node comes back online. Instead, the first node 310 needs to spend fewer computational resources to address the reregistration requests that came in while the first node was not operational.

If, upon receiving the message 390, the UE 330 requests IMS services while the first node 310 is still not operational, the second node 320 can do one of two things. Either the second node 320 can send an error message to the UE 330, or the second node can find a third node 305 in the IMS network 300 that can perform the function of the first node 310. For example, the second node 320 can find S-CSCF 305, different from the first node 310, that can serve the UE 330.

When the UE 330 requests services from the third node 305, the third node does not have knowledge of the UE 330, because the UE is not registered with the third node 305. Instead, the third node 305 sends a request to the HSS 360 asking whether the UE 330 is authorized to use IMS services that the UE is requesting. Upon receiving the confirmation from the HSS 360 that the UE 330 is authorized, the third node 305 can register with the HSS and offer IMS services to the UE. If the third node 305 does not receive confirmation from the HSS 360 that the UE 330 is authorized, the third node 305 can refuse to render the services to the UE. If the first node 310 comes back online while the third node 305 is serving the UE 330, the third node can disengage from service, and the first node 310 can continue serving the UE.

In the normal mode of operation of the first node 310, the first node stores a second timer 315, which indicates an amount of time slightly greater than the first timer 370. For example, when the first timer indicates 10 seconds less than an hour, the second timer can indicate an hour. After the initial registration 350, if the UE 330 does not send the reregistration request 380 within the amount of time specified by the second timer 315, the first node can send to the UE a notification of termination of the IMS registration. The notification of termination means that the subscription ended (terminated) because the registration was not refreshed before it expired. The UE 330 can retry immediately with the initiate registration request 340, which, as described above, requires more processing power than a reregistration request. However, sending another initial registration request, and beginning the registration process from the beginning, is more processor intensive, as explained here, than just performing a reregistration. Therefore, avoiding repetition of the initial registration can save the IMS network 300 resources.

By making the period of time indicated by the second timer 315 slightly greater than the period of time indicated by the first timer 370, the UE 330 has the option of sending the reregistration request 380 exactly at the expiration of the first timer. Further, the second timer indicating a slightly greater period of time than the first timer can account for network and processing delays between the UE 330 and the first node 310.

When the first node 310 becomes unavailable, the first node may not be able to receive the reregistration request 380; however, the second timer 315 can still continue to run. If the first node 310 does not come back online before the second timer 315 expires, the first node can delete the registration, e.g., de-register, the UE 330, even though the UE 330 has been sending the reregistration request 380. To avoid having to unnecessarily perform the initial registration, the IMS network 300 can increase the amount of time indicated by the second timer 315 by, for example, two or more times, causing the second timer to indicate that the first node should wait two or more hours prior to deleting the registration of the UE 330.

Figure 4:
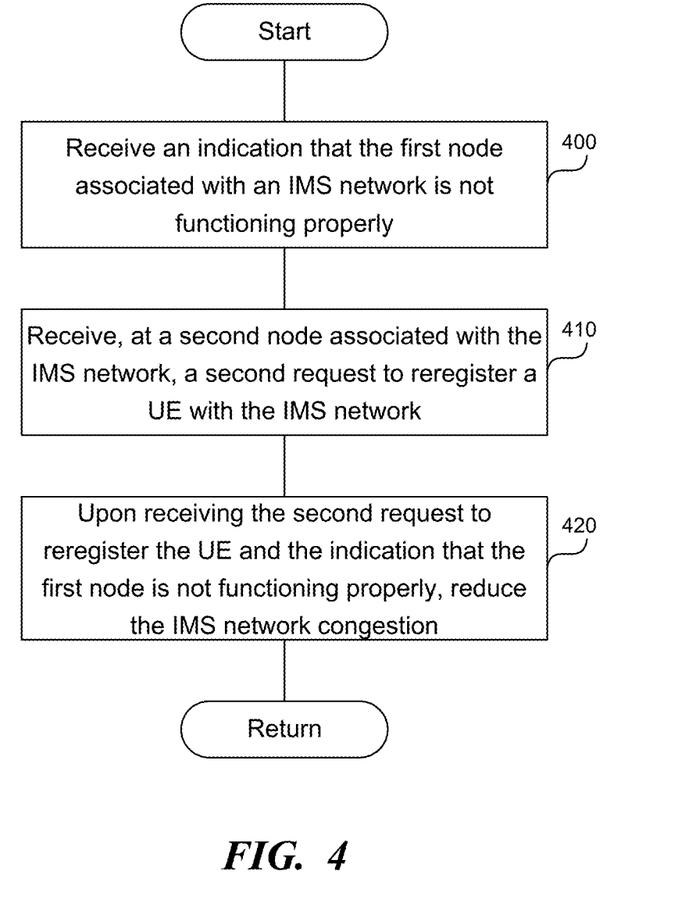
FIG. 4 is a flowchart of a method to reduce IMS network congestion when a node in the IMS network becomes unavailable.

FIG. 4 is a flowchart of a method to reduce IMS network congestion when a node in the IMS network becomes unavailable. The IMS network can be associated with the network 100 in FIG. 1.

In step 400, a hardware or software processor executing instructions described in this application can receive an indication that a first node associated with an IMS network is not functioning properly, such as that the node has failed or is congested. The first node can be I/S-CSCF. The first node can initiate a registration associated with a UE on the IMS network upon receiving a request to initially register the UE with the IMS network. After receiving the initial request, the first node can, at the predetermined interval, receive a request to reregister the UE. The predetermined interval can be every 30 minutes or every 55 minutes. Upon initially registering or reregistering the UE, the first node can create a first registration confirmation, and can send the first registration confirmation to the UE.

In step 410, the processor can receive, at a second node associated with the IMS network, a second request to reregister the UE with the IMS network, where the second node is an intermediary between a UE and the first node.

In step 420, upon receiving the second request to reregister the UE and the indication that the first node is not functioning properly, the processor can reduce IMS network congestion by performing the following steps. The processor can avoid reporting to the UE that the first node is not functioning properly. The processor can send to the UE, by the second node, a message indicating that the UE has been reregistered. The message can include a copy of the first registration confirmation associated with the UE, and a 200 OK message indicating that the IMS network is functioning properly. Further, the second node can avoid communicating with the first node, thus reducing the load on the network and reducing the load on the first node. After the UE receives the message, the UE can wait a predetermined amount of time before sending a third request to reregister the UE. The predetermined amount of time can be the same as the predetermined period, or can be different. Receiving the copy of the first registration prevents the UE from congesting the IMS network with repeated requests to initiate IMS registration and prevents the IMS network from expending resources to process the request to initiate IMS registration. The repeated requests to initiate IMS registration can be sent every second, as opposed to the request to reregister, which can be sent every 30 minutes or every 55 minutes. Further, the resources required to process the request to initiate IMS registration exceed the resources required to process a request to reregister. Additionally, preventing the UE from sending the request to initiate IMS registration, and instead sending the request to reregister, reduces the processing load on the IMS network. Finally, the request to initiate IMS registration needs to be sent to the first node, which is down, and cannot be handled by the second node. Since the first node is down, sending the request only clogs the network and does not help in repairing the first node.

The processor can send to the UE a first indication of an amount of time to wait prior to sending the third request to reregister the UE, where the predetermined amount of time is less than the first indication of the amount of time. The first node can maintain a timer associated with the first node of the IMS network. The first node can determine whether the first node of the IMS network received the third request to reregister the UE before the timer exceeded a second indication of an amount of time, where the second indication of the amount of time exceeds the first indication of the amount of time. Upon determining that the timer exceeded the second indication of the amount of time, the first node can send a notification to the UE indicating that an IMS session between the UE and the IMS network has been terminated. To prevent the IMS session from being terminated, upon receiving an indication that the first node associated with the IMS network is not functioning properly, the processor can increase the second indication of the amount of time, such that the second indication is twice or more than the first indication of the amount of time.

The processor can send to the UE a first indication of an amount of time to wait prior to sending the third request to reregister the UE, where the predetermined amount of time is less than the first indication of the amount of time. The processor can maintain a timer associated with the first node of the IMS network. The processor can determine whether the first node of the IMS network received the third request to reregister the UE before the timer exceeded a second indication of an amount of time, where the second indication of the amount of time exceeds the first indication of the amount of time. Upon determining that the timer exceeded the second indication of the amount of time, the processor can send a notification to the UE indicating that an IMS session between the UE and the IMS network has been terminated.

The processor can receive an indication from the UE requesting that the UE receive an IMS service from the IMS network. The processor can determine that the first node associated with the IMS network is not functioning properly. The processor can discover a third node associated with the IMS network, where the third node can provide IMS services associated with the first node to the UE. The third node can be a different S-CSCF node. The processor can register the third node with the HSS, indicating that the third node is providing the service to the UE. The processor can provide the IMS service to the UE using the third node of the IMS network by querying the HSS whether the UE is authorized to use the IMS network. The processor can receive a confirmation from the HSS that the UE is authorized to use the IMS network. The processor can provide the IMS service to the UE, where the UE is treated as an unregistered user. After the service is provided, such as voice or messaging, the third node can clear its registration from the HSS. The next time the UE requests registration, the UE can be served by the first node or another S-CSCF node.

The processor can receive an indication from the UE requesting that the UE receive an IMS service from the IMS network. The processor can determine that the first node associated with the IMS network is not functioning properly. The processor can discover a third node associated with the IMS network, where the third node can provide IMS services associated with the first node to the UE. The processor can provide the IMS service to the UE using the third node of the IMS network by querying the HSS whether the UE is authorized to use the IMS network. The processor can receive a confirmation from the HSS that the UE is authorized to use the IMS network. The processor can provide the IMS service to the UE.

The processor can receive an indication from the UE requesting that the UE receive an IMS service from the IMS network. The processor can determine that the first node associated with the IMS network is not functioning properly. The processor can send an error message to the UE indicating that the IMS service is not available.

The processor can receive an indication from the UE requesting that the UE receive an IMS service from the IMS network. The processor can determine that the first node associated with the IMS network is not functioning properly. The processor can discover a third node associated with the IMS network, where the third node can provide IMS services associated with the first node to the UE. The processor can provide the IMS service to the UE using the third node of the IMS network.

Figure 5:
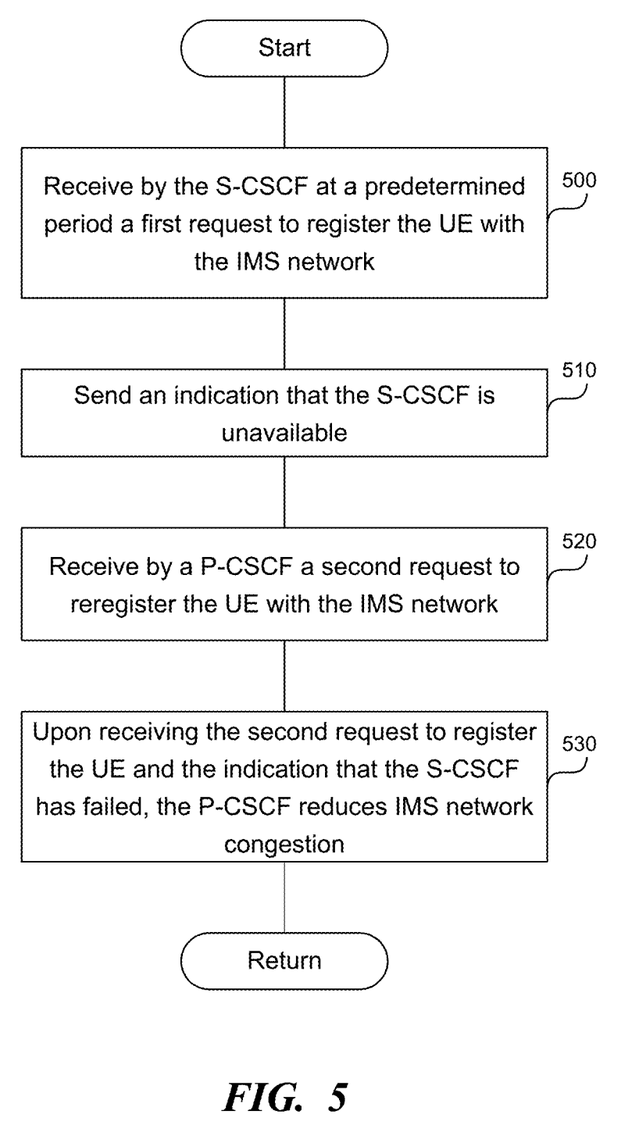
FIG. 5 shows steps a system can perform to reduce IMS network congestion when a node in the IMS network becomes unavailable.

FIG. 5 shows steps a system can perform to reduce IMS network congestion when a node in the IMS network becomes unavailable. In step 500, an S-CSCF associated with an IMS network can initiate a registration associated with a UE on the IMS network, and can receive at a predetermined period a first request to reregister the UE with the IMS network. The predetermined period can be every 30 minutes or every 55 minutes. The S-CSCF can create a first registration confirmation, and can send the first registration confirmation to the UE. The S-CSCF can become unavailable by the S-CSCF node itself failing, by the network to the S-CSCF failing, by a component of the S-CSCF failing, etc.

Once the S-CSCF becomes unavailable, in step 510, the S-CSCF can cause sending of an indication that the S-CSCF is unavailable.

In step 520, a P-CSCF can receive a second request to reregister the UE with the IMS network, where the P-CSCF is an intermediary between a UE and the S-CSCF. In step 530, upon receiving the second request to reregister the UE and the indication that the S-CSCF has failed, the P-CSCF can reduce IMS network congestion by avoiding reporting to the UE that the S-CSCF has failed, and by sending, by the P-CSCF to the UE, a copy of the first registration confirmation associated with the UE. Upon receiving the copy of the first registration confirmation, the UE waits the predetermined amount of time before sending a third request to reregister the UE, thus preventing the UE from congesting the IMS network with a request to initiate IMS registration and preventing the IMS network from expending resources to process the request to initiate IMS registration. Preventing the IMS network from expending the resources to process the request to initiate IMS registration can be significant because the resources required to process the request to initiate IMS registration exceed the resources required to process a request to reregister. By handling the communication from the UE, the P-CSCF can avoid communicating with and overwhelming the already impaired S-CSCF.

The S-CSCF can send to the UE a first indication of an amount of time to wait prior to sending the third request to reregister the UE, where the predetermined amount of time is less than the first indication of the amount of time. The S-CSCF can maintain a timer associated with the S-CSCF. The S-CSCF can determine whether the S-CSCF received the third request to reregister the UE before the timer exceeded a second indication of an amount of time, where the second indication of the amount of time exceeds the first indication of the amount of time. Upon determining that the timer exceeded the second indication of the amount of time, the S-CSCF can send a notification to the UE indicating that an IMS session between the UE and the IMS network has been terminated. Upon receiving an indication that the S-CSCF associated with the IMS network has failed, the S-CSCF can increase the second indication of the amount of time to twice or more than the first indication of the amount of time.

The S-CSCF can send to the UE a first indication of an amount of time to wait prior to sending the third request to reregister the UE, where the predetermined amount of time is less than the first indication of the amount of time. The S-CSCF can maintain a timer associated with the S-CSCF. The S-CSCF can determine whether the S-CSCF received the third request to reregister the UE before the timer exceeded a second indication of an amount of time, where the second indication of the amount of time exceeds the first indication of the amount of time. Upon determining that the timer exceeded the second indication of the amount of time, the S-CSCF can send a notification to the UE indicating that an IMS session between the UE and the IMS network has been terminated.

The P-CSCF can receive an indication from the UE requesting that the UE receive an IMS service from the IMS network. The P-CSCF can determine that the S-CSCF associated with the IMS network has failed. The P-CSCF can discover a second S-CSCF associated with the IMS network, where the second S-CSCF can provide IMS services associated with the S-CSCF to the UE. The P-CSCF can cause the second S-CSCF of the IMS network to provide the IMS service to the UE by querying the HSS whether the UE is authorized to use the IMS network. The P-CSCF can cause the second S-CSCF of the IMS network to receive a confirmation from the HSS that the UE is authorized to use the IMS network. The P-CSCF can cause the second S-CSCF of the IMS network to provide the IMS service to the UE. The P-CSCF can obtain an indication that the S-CSCF associated with the IMS network is functioning. The P-CSCF can cause the IMS network to provide the IMS service to the UE using a second S-CSCF.

The P-CSCF can receive an indication from the UE requesting that the UE receive an IMS service from the IMS network. The P-CSCF can determine that the S-CSCF associated with the IMS network has failed. The P-CSCF can discover a second S-CSCF associated with the IMS network, where the second S-CSCF can provide IMS services associated with the S-CSCF to the UE. The P-CSCF can cause the IMS network to provide the IMS service to the UE using the second S-CSCF of the IMS network by querying the HSS whether the UE is authorized to use the IMS network. The P-CSCF can cause the IMS network to receive a confirmation from the HSS that the UE is authorized to use the IMS network. The P-CSCF can cause the IMS network to provide the IMS service to the UE, wherein the UE is treated as an unregistered user.

The P-CSCF can receive an indication from the UE requesting that the UE receive an IMS service from the IMS network. The P-CSCF can determine that the S-CSCF associated with the IMS network has failed. The P-CSCF can cause the IMS network to discover a second S-CSCF associated with the IMS network, where the second S-CSCF can provide IMS services associated with the S-CSCF to the UE. The P-CSCF can cause the IMS network to provide the IMS service to the UE using the second S-CSCF of the IMS network.

Computer System

Figure 6:
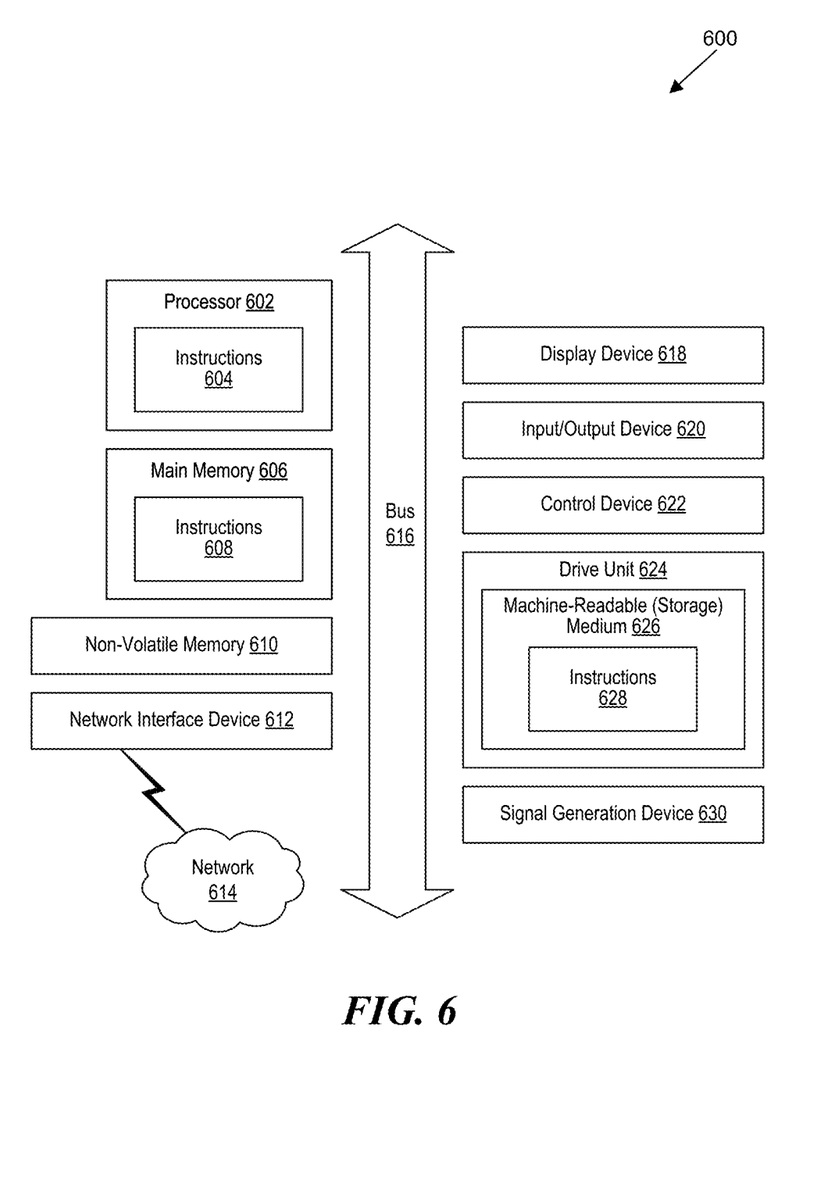
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common nodes (e.g., cache memory) are omitted from FIG. 6 for brevity. Instead, the computer system 600 is intended to illustrate a hardware device on which nodes illustrated or described relative to the examples of the Figures and any other nodes described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or the computer system 600 can include one or more cloud nodes in one or more networks. Where appropriate, one or more computer systems 600 can perform operations in real-time, near real-time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory computer-readable storage medium storing instructions to reduce Internet Protocol Multimedia Subsystem (IMS) network congestion when a Serving-Call Session Control Function (S-CSCF) fails, which, when executed by at least one data processor of a system, cause the system to:
   receive an indication that the S-CSCF associated with an IMS network has failed,
      wherein the IMS network is associated with a wireless communication network,
      wherein the S-CSCF is configured to initiate a registration associated with a user equipment (UE) on the IMS network,
      wherein the S-CSCF is configured to receive, at a predetermined period, a first request to reregister the UE with the IMS network,
      wherein the S-CSCF is configured to create a first registration confirmation, and
      wherein the S-CSCF is configured to send the first registration confirmation to the UE;
   receive, at a Proxy-Call Session Control Function (P-CSCF), a second request to reregister the UE with the IMS network,
      wherein the P-CSCF is an intermediary between a UE and the S-CSCF;
   upon receiving the second request to reregister the UE and the indication that the S-CSCF has failed, reduce IMS network congestion by:
      avoiding reporting to the UE that the S-CSCF has failed; and,
      sending, by the P-CSCF to the UE, a copy of the first registration confirmation associated with the UE,
         wherein the UE is configured to wait a predetermined amount of time before sending a third request to reregister the UE,
         wherein receiving the copy of the first registration confirmation prevents the UE from congesting the IMS network with a request to initiate IMS registration and prevents the IMS network from expending resources to process the request to initiate IMS registration, and, wherein the resources required to process the request to initiate IMS registration exceed resources required to process a request to reregister.

2. The at least one non-transitory computer-readable storage medium of claim 1, comprising instructions to:
send to the UE a first indication of an amount of time to wait prior to sending the third request to reregister the UE,
wherein the predetermined amount of time is less than the first indication of the amount of time,
wherein the S-CSCF is configured to maintain a timer associated with the S-CSCF,
wherein the S-CSCF is configured to determine whether the S-CSCF received the third request to reregister the UE before the timer exceeded a second indication of an amount of time,
wherein the second indication of the amount of time exceeds the first indication of the amount of time,
wherein the S-CSCF is configured to, upon determining that the timer exceeded the second indication of the amount of time, send a notification to the UE indicating that an IMS session between the UE and the IMS network has been terminated; and
upon receiving an indication that the S-CSCF associated with the IMS network has failed, increase the second indication of the amount of time.

3. The at least one non-transitory computer-readable storage medium of claim 1, comprising instructions to:
receive an indication from the UE requesting that the UE receive an IMS service from the IMS network;
determine that the S-CSCF associated with the IMS network has failed;
discover a third node associated with the IMS network, wherein the third node is configured to provide IMS services associated with the S-CSCF to the UE;
provide the IMS service to the UE using the third node of the IMS network by querying a Home Subscriber Server (HSS) whether the UE is authorized to use the IMS network;
receive a confirmation from the HSS that the UE is authorized to use the IMS network;
provide the IMS service to the UE;
determine that the S-CSCF associated with the IMS network is functioning; and
replace providing the IMS service to the UE using the third node by providing the IMS service to the UE using the S-CSCF.

4. The at least one non-transitory computer-readable storage medium of claim 1, comprising instructions to:
send to the UE a first indication of an amount of time to wait prior to sending the third request to reregister the UE,
wherein the predetermined amount of time is less than the first indication of the amount of time;
maintain a timer associated with the S-CSCF;
determine whether the S-CSCF received the third request to reregister the UE before the timer exceeded a second indication of an amount of time,
wherein the second indication of the amount of time exceeds the first indication of the amount of time; and
upon determining that the timer exceeded the second indication of the amount of time, send a notification to the UE indicating that an IMS session between the UE and the IMS network has been terminated.

5. The at least one non-transitory computer-readable storage medium of claim 1, comprising instructions to:
receive an indication from the UE requesting that the UE receive an IMS service from the IMS network;
determine that the S-CSCF associated with the IMS network has failed;
discover a third node associated with the IMS network, wherein the third node is configured to provide IMS services associated with the S-CSCF to the UE;
provide the IMS service to the UE using the third node of the IMS network by querying a Home Subscriber Server (HSS) whether the UE is authorized to use the IMS network;
receive a confirmation from the HSS that the UE is authorized to use the IMS network; and
provide the IMS service to the UE.

6. The at least one non-transitory computer-readable storage medium of claim 1, comprising instructions to:
receive an indication from the UE requesting that the UE receive an IMS service from the IMS network;
determine that the S-CSCF associated with the IMS network has failed; and
send an error message to the UE.

7. The at least one non-transitory computer-readable storage medium of claim 1, comprising instructions to:
receive an indication from the UE requesting that the UE receive an IMS service from the IMS network;
determine that the S-CSCF associated with the IMS network has failed;
discover a third node associated with the IMS network, wherein the third node is configured to provide IMS services associated with the S-CSCF to the UE; and
provide the IMS service to the UE using the third node of the IMS network.

8. A system comprising:
at least one hardware processor; and
at least one non-transitory memory storing instructions, which, when executed by the at least one hardware processor, cause the system to:
receive an indication that a first node associated with an Internet Protocol Multimedia Subsystem (IMS1 network is not functioning properly, wherein the first node is configured to:
handle an initial registration associated with a user equipment (UE1 on the IMS network,
receive, at a predetermined period, a first request to reregister the UE with the IMS network,
create a first registration confirmation, and
send the first registration confirmation to the UE;
receive, at a second node associated with the IMS network, a second request to reregister the UE with the IMS network,
wherein the second node is an intermediary between a UE and the first node;
upon receiving the second request to reregister the UE and the indication that the first node is not functioning properly:
avoiding reporting to the UE that the first node is not functioning properly; and,
sending, by the second node to the UE, a message indicating that the UE has been reregistered,
wherein the UE is configured to wait a predetermined amount of time before sending a third request to reregister the UE;
send to the UE a first indication of an amount of time during which a registration of the UE on the IMS network is valid, wherein the predetermined amount of time is less than the first indication of the amount of time;

maintain a timer associated with the first node of the IMS network;

determine whether the first node of the IMS network received the third request to reregister the UE before the timer exceeded a second indication of an amount of time, wherein the second indication of the amount of time exceeds the first indication of the amount of time; and upon determining that the timer exceeded the second indication of the amount of time, send a notification to the UE indicating that an IMS session between the UE and the IMS network has been terminated.

9. The system of claim 8, comprising instructions to:

send to the UE a first indication of an amount of time to wait prior to sending the third request to reregister the UE, wherein the predetermined amount of time is less than the first indication of the amount of time, wherein the first node is configured to maintain a timer associated with the first node of the IMS network, wherein the first node is configured to determine whether the first node of the IMS network received the third request to reregister the UE before the timer exceeded a second indication of an amount of time, wherein the second indication of the amount of time exceeds the first indication of the amount of time, wherein the first node is configured to, upon determining that the timer exceeded the second indication of the amount of time, send a notification to the UE indicating that an IMS session between the UE and the IMS network has been terminated; and upon receiving an indication that the first node associated with the IMS network is not functioning properly, increase the second indication of the amount of time.

10. The system of claim 8, comprising instructions to:

receive an indication from the UE requesting that the UE receive an IMS service from the IMS network;

determine that the first node associated with the IMS network is not functioning properly;

discover a third node associated with the IMS network, wherein the third node is configured to provide IMS services associated with the first node to the UE;

provide the IMS service to the UE using the third node of the IMS network by querying a Home Subscriber Server (HSS) whether the UE is authorized to use the IMS network;

receive a confirmation from the HSS that the UE is authorized to use the IMS network;

provide the IMS service to the UE;

determine that the first node associated with the IMS network is functioning; and replace providing the IMS service to the UE using the third node by providing the IMS service to the UE using the first node.

11. The system of claim 8, comprising instructions to:

receive an indication from the UE requesting that the UE receive an IMS service from the IMS network;

determine that the first node associated with the IMS network is not functioning properly;

discover a third node associated with the IMS network, wherein the third node is configured to provide IMS services associated with the first node to the UE;

provide the IMS service to the UE using the third node of the IMS network by querying a Home Subscriber Server (HSS) whether the UE is authorized to use the IMS network;

receive a confirmation from the HSS that the UE is authorized to use the IMS network; and provide the IMS service to the UE.

12. The system of claim 8, comprising instructions to:

receive an indication from the UE requesting that the UE receive an IMS service from the IMS network;

determine that the first node associated with the IMS network is not functioning properly; and send an error message to the UE.

13. The system of claim 8, comprising instructions to:

receive an indication from the UE requesting that the UE receive an IMS service from the IMS network;

determine that the first node associated with the IMS network is not functioning properly;

discover a third node associated with the IMS network, wherein the third node is configured to provide IMS services associated with the first node to the UE; and provide the IMS service to the UE using the third node of the IMS network.

14. A system comprising:

at least one hardware processor; and at least one non-transitory memory storing instructions, which, when executed by the at least one hardware processor, cause the system to implement:

a Serving-Call Session Control Function (S-CSCF) associated with an Internet Protocol Multimedia Subsystem (IMS) network, wherein the IMS network is associated with a wireless communication network, and, wherein the S-CSCF is configured to:

handle an initial registration associated with a user equipment (UE) on the IMS network, receive, at a predetermined period, a first request to reregister the UE with the IMS network, create a first registration confirmation, send the first registration confirmation to the UE, and cause sending of an indication that the S-CSCF is unavailable; and a Proxy-Call Session Control Function (P-CSCF) configured to receive a second request to reregister the UE with the IMS network, wherein the P-CSCF is an intermediary between a UE and the S-CSCF; and, wherein the P-CSCF, upon receiving the second request to reregister the UE and the indication that the S-CSCF has failed, is configured for:

avoiding reporting to the UE that the S-CSCF has failed;

sending, by the P-CSCF to the UE, a copy of the first registration confirmation associated with the UE, wherein the UE is configured to consider a registration of the UE on the IMS network valid during a predetermined amount of time, wherein upon expiration of the predetermined amount of time the UE is configured to send a third request to reregister the UE.

15. The system of claim 14, wherein the S-CSCF is configured to:

send to the UE a first indication of an amount of time to wait prior to sending the third request to reregister the UE, wherein the predetermined amount of time is less than the first indication of the amount of time;
maintain a timer associated with the S-CSCF;
determine whether the S-CSCF received the third request to reregister the UE before the timer exceeded a second indication of an amount of time, wherein the second indication of the amount of time exceeds the first indication of the amount of time;
upon determining that the timer exceeded the second indication of the amount of time, send a notification to the UE indicating that an IMS session between the UE and the IMS network has been terminated; and
upon receiving an indication that the S-CSCF associated with the IMS network has failed, increase the second indication of the amount of time.

16. The system of claim 14, wherein the S-CSCF is configured to:
send to the UE a first indication of an amount of time to wait prior to sending the third request to reregister the UE,
wherein the predetermined amount of time is less than the first indication of the amount of time;
maintain a timer associated with the S-CSCF;
determine whether the S-CSCF received the third request to reregister the UE before the timer exceeded a second indication of an amount of time,
wherein the second indication of the amount of time exceeds the first indication of the amount of time; and
upon determining that the timer exceeded the second indication of the amount of time, send a notification to the UE indicating that an IMS session between the UE and the IMS network has been terminated.

17. The system of claim 14, wherein the P-CSCF is configured to:
receive an indication from the UE requesting that the UE receive an IMS service from the IMS network;
determine that the S-CSCF associated with the IMS network has failed;
discover a second S-CSCF associated with the IMS network,
wherein the second S-CSCF is configured to provide IMS services associated with the S-CSCF to the UE;
cause the second S-CSCF of the IMS network to provide the IMS service to the UE by querying a Home Subscriber Server (HSS) whether the UE is authorized to use the IMS network;
cause the second S-CSCF of the IMS network to receive a confirmation from the HSS that the UE is authorized to use the IMS network;
cause the second S-CSCF of the IMS network to provide the IMS service to the UE;
obtain an indication that the S-CSCF associated with the IMS network is functioning; and
cause the IMS network to replace providing the IMS service to the UE using the second S-CSCF by providing the IMS service to the UE using the S-CSCF.

18. The system of claim 14, wherein the P-CSCF is configured to:
receive an indication from the UE requesting that the UE receive an IMS service from the IMS network;
determine that the S-CSCF associated with the IMS network has failed;
discover a second S-CSCF associated with the IMS network,
wherein the second S-CSCF is configured to provide IMS services associated with the S-CSCF to the UE; and
cause the IMS network to provide the IMS service to the UE using the second S-CSCF of the IMS network by querying a Home Subscriber Server (HSS) whether the UE is authorized to use the IMS network;
cause the IMS network to receive a confirmation from the HSS that the UE is authorized to use the IMS network; and
cause the IMS network to provide the IMS service to the UE.

19. The system of claim 14, wherein the P-CSCF is configured to:
receive an indication from the UE requesting that the UE receive an IMS service from the IMS network;
determine that the S-CSCF associated with the IMS network has failed;
cause the IMS network to discover a second S-CSCF associated with the IMS network,
wherein the second S-CSCF is configured to provide IMS services associated with the S-CSCF to the UE; and
cause the IMS network to provide the IMS service to the UE using the second S-CSCF of the IMS network.

* * * * *